US010757577B2

(12) United States Patent
Richards et al.

(10) Patent No.: US 10,757,577 B2
(45) Date of Patent: Aug. 25, 2020

(54) DETECTING NON-WI-FI CERTIFIED DEVICES TRANSMITTING 802.11 SIGNALS

(71) Applicant: Telefonaktiebolaget LM Ericsson (publ), Stockholm (SE)

(72) Inventors: Christopher Richards, Ottawa (CA); Roland Smith, Nepean (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 385 days.

(21) Appl. No.: 15/751,259

(22) PCT Filed: Dec. 20, 2017

(86) PCT No.: PCT/SE2017/051313
§ 371 (c)(1),
(2) Date: Feb. 8, 2018

(87) PCT Pub. No.: WO2019/125245
PCT Pub. Date: Jun. 27, 2019

(65) Prior Publication Data

US 2020/0205008 A1 Jun. 25, 2020

(51) Int. Cl.
*H04W 74/08* (2009.01)
*H04W 72/04* (2009.01)
(Continued)

(52) U.S. Cl.
CPC ......... *H04W 16/14* (2013.01); *H04L 27/0006* (2013.01); *H04W 8/005* (2013.01);
(Continued)

(58) Field of Classification Search
CPC ..... H04W 72/02; H04W 48/08; H04W 48/14; H04W 48/20
See application file for complete search history.

(56) References Cited

U.S. PATENT DOCUMENTS 8,982,785 B2 * 3/2015 Pandey ................ H04W 8/005 370/328
2012/0082039 A1 * 4/2012 Li ............................ G01S 3/14 370/252

(Continued)

FOREIGN PATENT DOCUMENTS

WO 2017/207682 A1 12/2017

OTHER PUBLICATIONS

International Search Report and Written Opinion issued in International Application No. PCT/EP2017/051313, dated Aug. 23, 2018, 12 pages.

*Primary Examiner* — Raj Jain
(74) *Attorney, Agent, or Firm* — Rothwell, Figg, Ernst & Manbeck, P.C.

(57) ABSTRACT

Embodiments herein relate to a method performed by a first radio device, for handling 802.11 signals transmitted by a second radio device. The second radio device is a non-Wi-Fi certified device. The method comprises receiving a transmission from the second radio device comprising 802.11 signal and detecting the second radio device being a non-Wi-Fi certified device, by determining the signaling behavior of the second radio device deviating from a Wi-Fi certified device's signaling behavior. Embodiments herein also relate to a first radio device, for handling 802.11 signals transmitted by non-Wi-Fi certified second radio device. The first radio device is configured to receive transmission from second radio device comprising 802.11 signal and detect the second radio device transmitting an 802.11 signal being a non-Wi-Fi certified device, by determining the signaling behavior of the second radio device deviating from that of a Wi-Fi certified device.

34 Claims, 10 Drawing Sheets

110
2100
122
2122
2125
2115
2110
121
2121

(51) Int. Cl.

| | |
|---|---|
| ***H04W 12/10*** | (2009.01) |
| ***H04W 72/02*** | (2009.01) |
| ***H04W 16/14*** | (2009.01) |
| ***H04W 8/00*** | (2009.01) |
| ***H04L 27/00*** | (2006.01) |
| ***H04W 12/12*** | (2009.01) |
| ***H04W 84/12*** | (2009.01) |

(52) U.S. Cl.

CPC ....... *H04W 12/1008* (2019.01); *H04W 12/12* (2013.01); *H04W 72/02* (2013.01); *H04W 72/0453* (2013.01); *H04W 74/0808* (2013.01); *H04W 84/12* (2013.01)

(56) References Cited

U.S. PATENT DOCUMENTS

2014/0192692 A1* 7/2014 Stark ................. H04W 52/0209
370/311
2015/0229461 A1* 8/2015 DiFazio .................... H04L 5/14
370/280
2016/0295420 A1 10/2016 Luo et al.
2016/0353425 A1* 12/2016 Iwami ............... H04W 72/0406
2018/0234978 A1* 8/2018 Shao ..................... H04W 72/02

* cited by examiner

Figure 20-1—PPDU format

DETECTING NON-WI-FI CERTIFIED DEVICES TRANSMITTING 802.11 SIGNALS

CROSS REFERENCE TO RELATED APPLICATION(S)

This application is a 35 U.S.C. § 371 National Stage of International Patent Application No. PCT/SE2017/051313, filed Dec. 20, 2017, designating the United States, the disclosure of which is incorporated by reference.

TECHNICAL FIELD

Embodiments herein relate to a method and a first radio device for detecting non-Wi-Fi certified devices transmitting 802.11 signals.

BACKGROUND OF THE INVENTION

The fast uptake of 3GPP Long Term Evolution (LTE) in different regions of the world shows both that demand for wireless broadband data is increasing, and that LTE is an extremely successful platform to meet that demand. Existing and new spectrum licensed for exclusive use by IMT technologies will remain fundamental for providing seamless coverage, achieving the highest spectral efficiency, and ensuring the highest reliability of cellular networks through careful planning and deployment of high-quality network equipment and devices.

To meet ever increasing data traffic demand from users and, in particular, in concentrated high traffic buildings or hot spots, more mobile broadband bandwidth will be needed. Given the large amount of spectrum available in the unlicensed bands around the globe as shown in FIG. 1, unlicensed spectrum is more and more considered by cellular operators as a complementary tool to augment their service offering. FIG. 1 discloses the unlicensed spectrum in 5 GHz available in selected countries or regions, such as Korea, China, Japan, the US and the European Union. While an unlicensed spectrum can never match the qualities of the licensed regime, solutions that allow an efficient use of it as a complement to licensed deployments have the potential to bring great value to the 3GPP operators, and, ultimately, to the 3GPP industry as a whole. This type of solutions would enable operators and vendors to leverage the existing or planned investments in LTE and 3GPP Evolved Packet Core (EPC) hardware in the radio and core network.

The unlicensed spectrum in general allows non-exclusive use. Given the widespread deployment and usage of other technologies in unlicensed spectrum for wireless communications in our society, it is envisioned that LTE would have to coexist with existing and future uses of unlicensed spectrum. Some regulatory regime adopts technology-neutral coexistence policy. For instance, the US FCC Part 15.407 rule states "The primary operating condition for unlicensed devices is that the operator must accept whatever interference is received and must correct whatever interference it causes. Should harmful interference occur, the operator is required to immediately correct the interference problem or cease operation."

However many jurisdictions require a Clear Channel Assessment (CCA) protocol, often referred to as Listen Before Talk (LBT). The basic LBT operation of LBT is to sense for energy on the shared channel and not transmit until there is no energy detected on the channel above an Energy Detection (ED) threshold.

The IEEE 802.11 Wi-Fi standard implements LBT. In addition to Energy Detection using Carrier-Sense Multiple Access (CSMA), Wi-Fi certified devices conforming to the IEEE 802.11 standard, implement a CCA protocol to specifically detect transmissions from other Wi-Fi certified devices known as preamble detection termed (CCA-PD) or Carrier Sense termed (CCA-CS). The CCA-PD protocol changes the behavior of the transmitters LBT protocol to avoid transmitting while another Wi-Fi certified device is transmitting. CCA-PD may be considered as a second level energy detection threshold, set to the sensitivity level of Wi-Fi certified devices. In IEEE 802.11, the ED threshold is specified at −62 dBm, while the CCA-PD threshold is specified to be at least −82 dBm. This means that transmissions from other Wi-Fi certified devices are given a 20 dB advantage over transmissions from non-Wi-Fi certified devices.

As a result, many vendors of devices which are not certified by the Wi-Fi Alliance, which may herein also be referred to as non-Wi-Fi certified devices, propose to use 802.11 transmitters to send 802.11 CTS packets in advance of their non-Wi-Fi certified transmissions in the unlicensed spectrum, thus protecting the non-Wi-Fi certified transmission down to the lower CCA-PD threshold. For example, some vendors of LTE-U and LTE-LAA eNBs have added this capability to their products.

Various standards bodies such as 3GPP and MuLTEfire allow this capability as an optional feature. The Institute of Electrical and Electronics Engineers (IEEE), the Wi-Fi Alliance (WFA), and equipment vendors in the Wi-Fi industry are calling for this capability to be made mandatory in regulations and standards specifications. They want to ensure that e.g. LTE Licensed Assisted Access (LAA) and other non-Wi-Fi technologies do not have an advantage over Wi-Fi. Thus they prefer that all devices operate like Wi-Fi certified devices, i.e. transmit Wi-Fi 802.11 preambles and use the 802.11 ED and PD thresholds.

Some non-Wi-Fi certified equipment may transmit 802.11 signals in order to gain the 20 dB protected advantage that 802.11 provides to other Wi-Fi certified devices but there is no requirement for non-Wi-Fi certified equipment to act reciprocally, i.e. to decode 802.11 signals. The non-Wi-Fi certified equipment, which may herein also be referred to a device, may be of any technology not being conform with the IEEE 802.11 standard, including but not limited to LTE in Unlicensed spectrum (LTE-U) eNBs, LTE Licensed Assisted Access (LAA) eNBs, LTE LAA User Equipment (UE) or MuLTEfire Access Points (APs) or MuLTEfire UEs. The device m This has the effect that the non-Wi-Fi certified equipment is gaining another 10 dB advantage, thereby putting Wi-Fi certified devices at a 10 dB disadvantage over non-Wi-Fi certified devices that transmit but do not decode 802.11 signals compared to genuine Wi-Fi certified nodes. Since the 802.11 transmissions by the non-Wi-Fi certified nodes appear as genuine Wi-Fi certified transmissions, there has been no way of detecting such a situation.

SUMMARY OF THE INVENTION

It is thus an object of embodiments herein to provide a method for handling 802.11 signals transmitted by non-Wi-Fi certified devices in order to distinguish the transmissions from genuine Wi-Fi certified devices in order to apply a correct IEEE 802.11 protocol behavior to such transmissions.

According to a first aspect of embodiments herein, the object is achieved by a method performed by a first radio device, for handling 802.11 signals transmitted by a second radio device. The second radio device is a non-Wi-Fi certified device. The first radio device receives a transmission from the second radio device comprising an 802.11 signal. The second radio device detects that the second radio device is a non-Wi-Fi certified device, by determining that the signaling behavior of the second radio device deviates from the signaling behavior of a Wi-Fi certified device.

According to a second aspect of embodiments herein, the object is achieved by a first radio device, for handling 802.11 signals transmitted by a second radio device. The second radio device is a non-Wi-Fi certified device. The first radio device is configured to receive a transmission from the second radio device comprising an 802.11 signal. The first radio device is further configured to detect that the second radio device transmitting the 802.11 signal is a non-Wi-Fi certified device, by being configured to determine that the signaling behavior of the second radio device deviates from the signaling behavior of a Wi-Fi certified device.

It is furthermore provided herein a computer program comprising instructions, which, when executed on at least one processor, cause the at least one processor to carry out any of the methods above, as performed by the first radio device. It is additionally provided herein a computer-readable storage medium, having stored thereon a computer program comprising instructions which, when executed on at least one processor, cause the at least one processor to carry out the method according to any of the methods above, as performed by the first radio device.

By detecting that the second radio device transmitting 802.11 signals is a non-Wi-Fi certified device the radio node is able to discern genuine Wi-Fi certified transmissions from non-Wi-Fi certified transmissions.

The first radio device may then use this information in several ways to improve the transmissions from Wi-Fi certified devices. For example by applying an optimized CSMA set of parameters. The first radio device may recognize that the non-Wi-Fi certified transmitter is LTE-LAA, and may decide that a reduction in ED threshold is warranted, as LTE-LAA radios are typically designed to operate to a significantly higher SINR levels due to the tighter subcarrier spacing yielding longer OFDM symbols.

Given this information, the first radio device may then alter its own behavior or communicate the information to other elements in its network such as Radio Resource Management (RRM), operations and management functions in order to alert network administrators, other Wi-Fi certified access points or Wi-Fi certified stations so that they can alter their behavior.

Other examples include but are not limited to: collecting information about the type of neighbor nodes, changing the network connection preference of user devices by means of broadcast signaling and changing the CSMA parameters.

BRIEF DESCRIPTION OF THE DRAWINGS

Embodiments will now be described in more detail in relation to the enclosed drawings, in which.

DETAILED DESCRIPTION OF PREFERRED EMBODIMENTS

Figure 1:
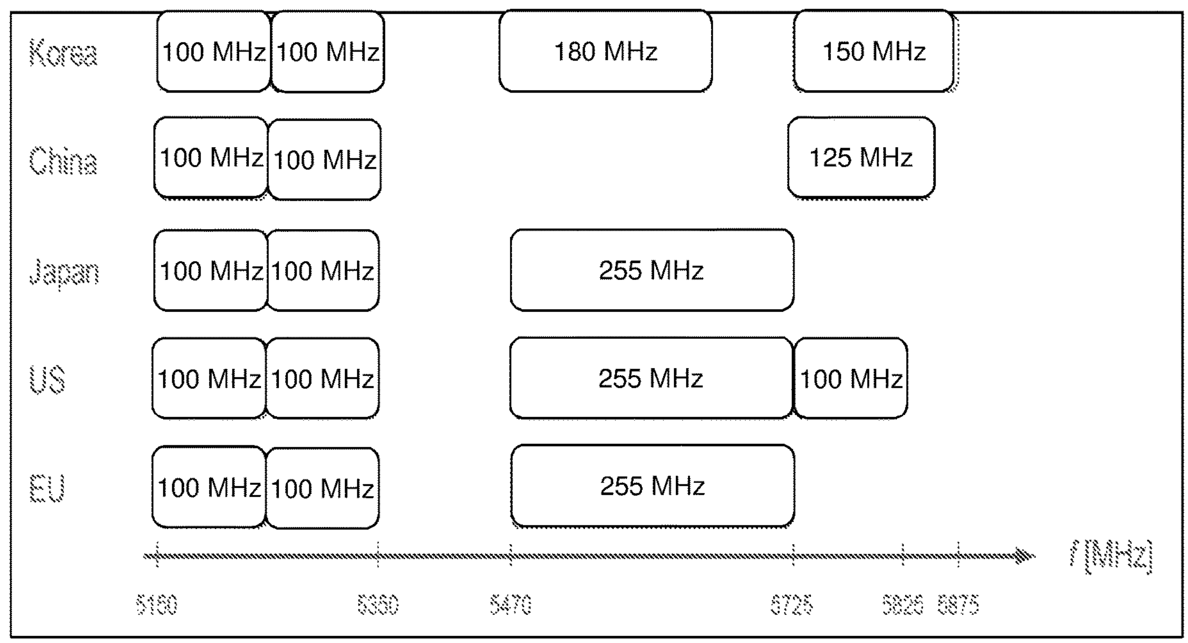
FIG. 1 is a schematic overview depicting unlicensed bands in the 5 GHz spectrum in selected regions.
Figure 2:
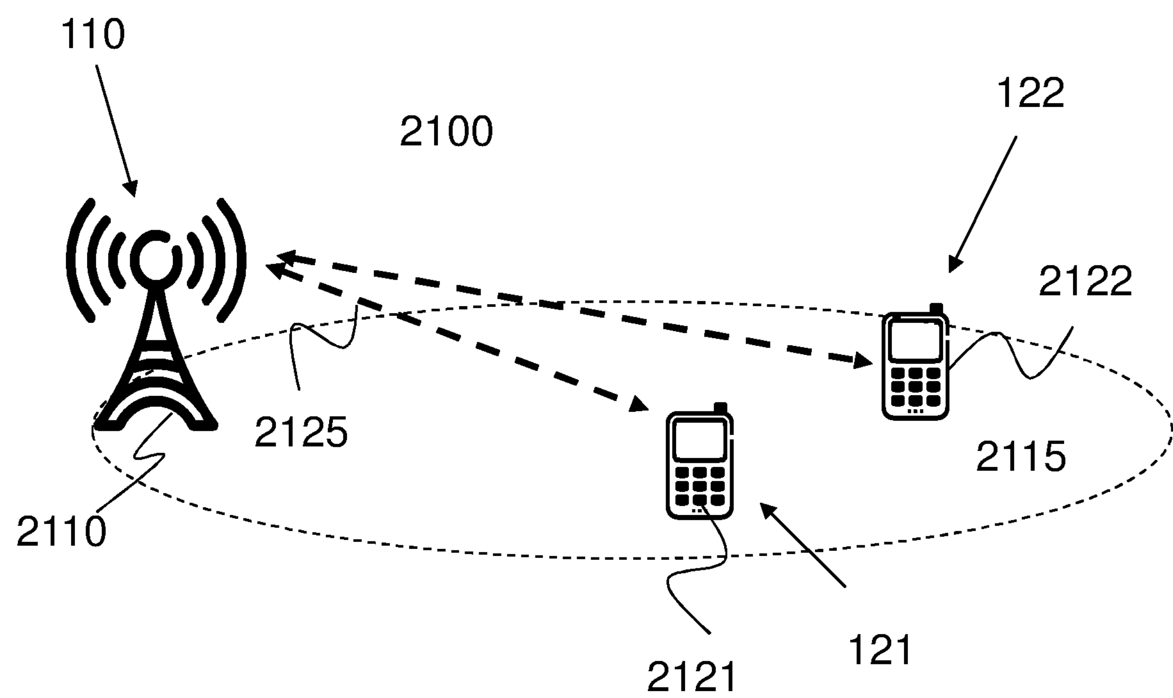
FIG. 2 is a schematic overview depicting an exemplary communication network.

FIG. 2 is a block diagram illustrating an example wireless communication network, according to embodiments herein. The wireless communication network 100 comprises a plurality of radio devices 110, 121, 122. In this particular embodiment, a first radio device 110 is represented by a radio network node 2110, such as e.g. a base station, an eNB or a gNB depending on the cellular technology used, and one or more second radio devices 121, 122 are represented by User Equipment (UE) 2121, 2122, such as e.g. mobile phones, smart phones, laptop computers, tablet computers, MTC devices, or any other devices that can provide wireless communication. The UEs 2121, 2122 may also be referred to as a wireless device. The radio network node 2110 serves a coverage area 2115, which may also be referred to as e.g. a cell or a beam. In general, UEs 2121, 2122 that are within coverage of the radio network node 2110, such as e.g., within the cell 2115 served by network node 2110, communicate with the network node 2110 by transmitting and receiving wireless signals 2125. For example, UEs 2121, 2122 and radio network nodes 2110 may communicate wireless signals 2125 containing voice traffic, data traffic, and/or control signals. When the radio network node 2110 is communicating voice traffic, data traffic, and/or control signals to the UE 2121, 2122 it may be referred to as a serving network node for the UE 2121, 2122. The wireless signals 2125 may include both downlink transmissions, i.e. from the radio network node 2110 to the UE 2121, 2122, and uplink transmissions, i.e. from the UE 2121, 2122 to the radio network node 2110. Each radio network node 2110 may have a single transmitter or multiple transmitters for transmitting signals 2125 to UEs 2121, 2122. In some embodiments, the radio network node 2110 may comprise a multi-input multi-output (MIMO) system. Similarly, each UE 2121, 2122 may have a single receiver or multiple receivers for receiving signals 2125 from radio network nodes 2110 or other UEs 2121, 2122. The second radio device 121, such as the UE 2121 according to this particular embodiment, may be a non-Wi-Fi certified device primarily operating a wireless protocol other than IEEE 802.11 and the radio device 122, such as the UE 2122 according to this particular embodiment, may be a Wi-Fi certified device primarily operating IEEE 802.11 as wireless protocol. Although, in this particular embodiment, the first radio device 110 is represented by a radio network node 2110, the second non-Wi-Fi certified device 121 is represented by a UE 2121 and the Wi-Fi certified device 122 is represented by a UE 1122, this shall not be considered limiting for the embodiments herein. The radio devices 110, 121, 122 may e.g. be either a node or a user equipment, so that in some embodiments the first radio device 110 may e.g. also be the UE 2121 or the UE 2122, and the second non-Wi-Fi certified device 122 may in some embodiments e.g. be the radio network node 2110.

There are several key differences between Wi-Fi certified and non-Wi-Fi certified devices, which may be employed in order to detect non-Wi-Fi certified devices according to the embodiments disclosed herein. A non-Wi-Fi certified node is a device that is primarily operating a wireless protocol other than 802.11, such as for example 3GPP LAA, but transmits some 802.11 signaling in order to appear as a fully compliant 802.11 transmitter to other devices that are operating on the same radio channel(s). Wi-Fi certified and non-Wi-Fi certified nodes may herein also be referred to as Wi-Fi certified and non-Wi-Fi certified devices. The term node and the term device may hereinafter be used interchangeably. Detection of non-Wi-Fi certified devices may be used in order to collect data about the Radio Frequency (RF) environment and/or to allow a node to dynamically adjust its operating mode, such as for example, adjusting ED threshold levels to optimize performance of genuine Wi-Fi certified devices operating on the radio channel(s). The term radio device as used herein may include nodes and or User Equipment (UE) using radio to communicate with each other.

The term node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), and base stations (BSs) (e.g., radio base stations, Node Bs, evolved Node Bs (eNBs) and NR NodeBs (gNBs).

The term User Equipment refers to a device capable, configured, arranged and/or operable to communicate wirelessly with network nodes and/or other wireless devices. Examples of a UE include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A UE may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a UE may represent a machine or other device that performs monitoring and/or measurements, and transmits the results of such monitoring and/or measurements to another UE and/or a network node. The UE may in this case be a machine-to-machine (M2M) device, which may in a 3GPP context be referred to as an MTC device.

The following methods 1 to 6, which may herein also be referred to as triggers, may be used by a first radio device in a network to detect non-Wi-Fi certified radio devices that are transmitting 802.11 signals according to the embodiments herein. The first radio device may be a Wi-Fi certified or a non-Wi-Fi certified device, such as e.g.

Figure 3:
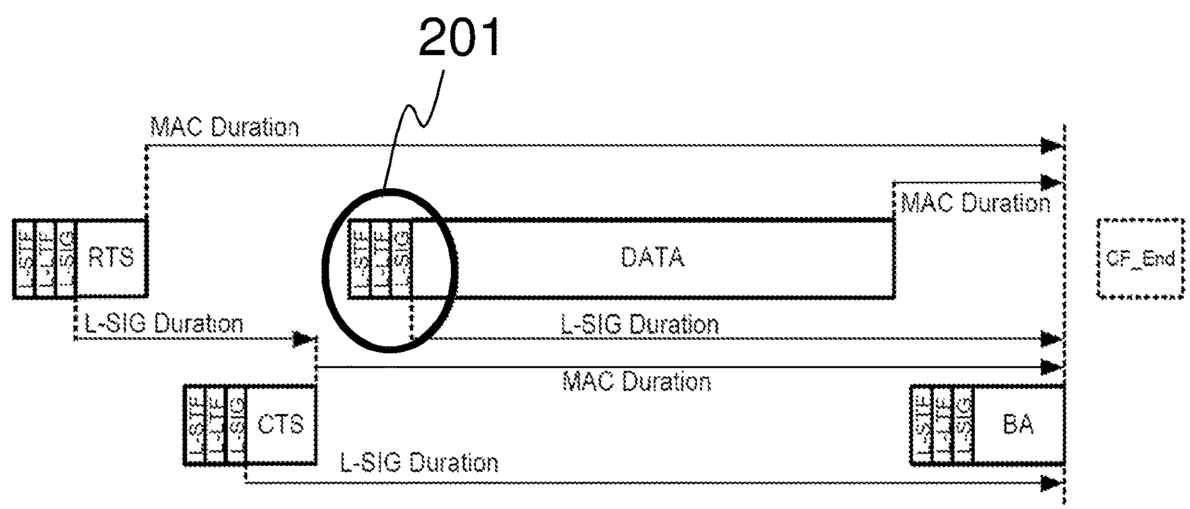
FIG. 3 is a schematic overview depicting IEEE 802.11 signaling.
Figure 4:
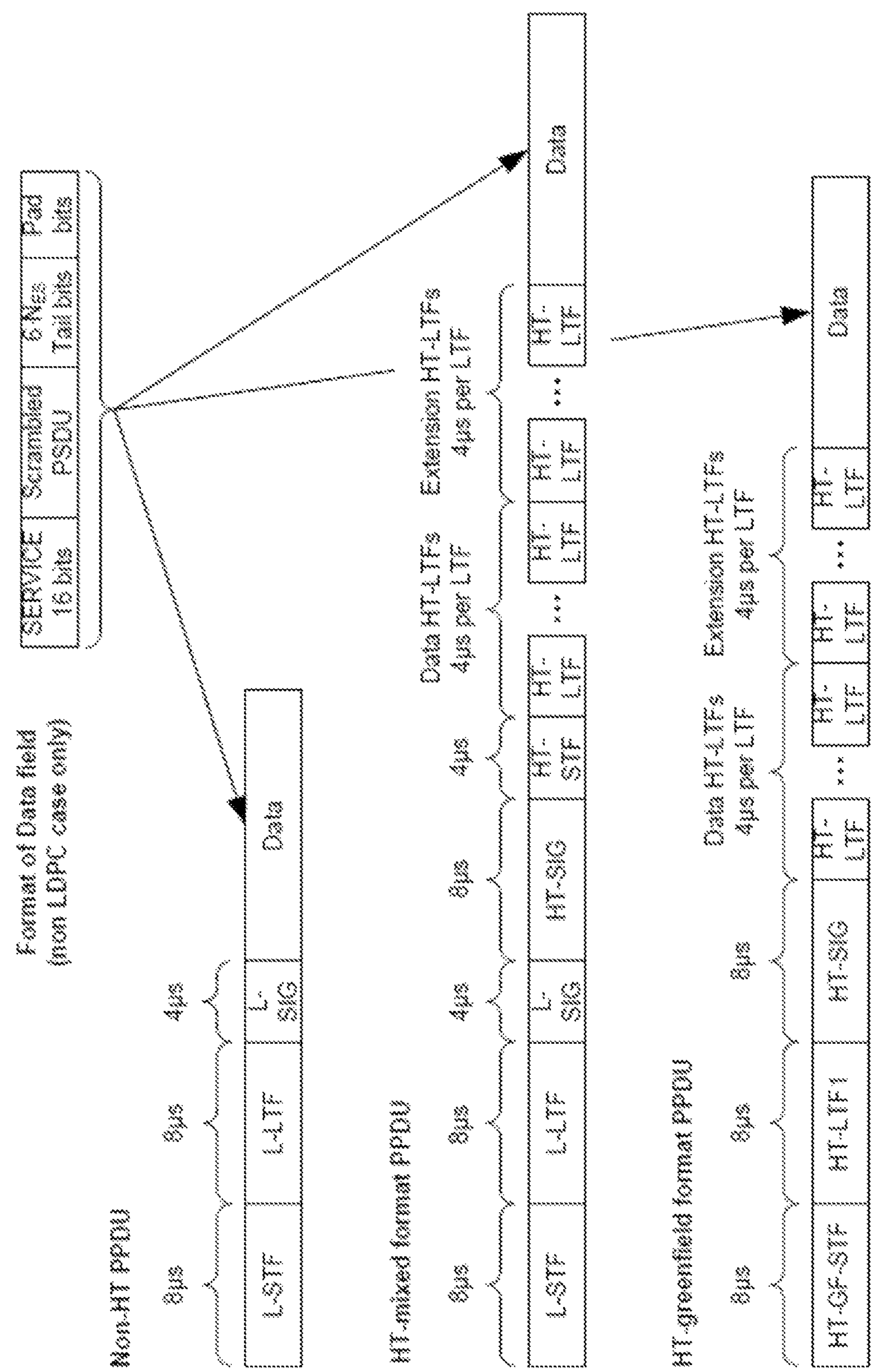
FIG. 4 is a schematic overview depicting various signaling preambles according to IEEE 802.11.

1. Non-Wi-Fi certified radio devices typically do not transmit 802.11 Beacon frames, even though they may transmit 802.11 management frames, such as e.g. Clear to Send (CTS) frames, or possibly 802.11 physical (PHY) layer frames, such as e.g. a Legacy Short Training Field (L-STF), Legacy Long Training Field (L-LTF), and Legacy Signal (L-SIG), to reserve the channel for the non-Wi-Fi certified transmission. Hence, the first radio device 110 may record all Beacon MAC addresses and record all CTS packet MAC addresses, such as Source & Destination, received from a second radio device. If the CTS packet Source and Destination MAC addresses are not found in the recorded Beacon MAC addresses, then the transmitting second radio device is a non-Wi-Fi certified device.
2. Genuine 802.11 transmissions after CTS packets start with an 802.11 Preamble. FIG. 2 shows an overview of 802.11 transmission. As can be seen a CTS packet being sent. The following 802.11 transmission, which in FIG. 2 referred to as DATA, starts with an 802.11 preamble 201 comprising of L-STF, L-LTF, and L-SIG. Wi-Fi certified devices typically do not send an 802.11 reservation packet, such as e.g. CTS in 5 GHz. When they do send these packets, the subsequent transmission is typically a recognizable 802.11 preamble, which may also be referred to as an 802.11 packet header. In short, non-Wi-Fi certified devices will not send the 802.11 Preamble after the CTS packet has been transmitted. FIG. 3 shows the various 802.11 preambles used for 802.11 transmissions, such as e.g. L-STF, L-LTF, and L-SIG as shown in FIG. 3 for the Non-High Throughput (HT) PLOP Protocol Data Unit (PPDU), or High Throughput Short Training Field (HT-STF), High Throughput Long Training Field (HT-LTF), and High Throughput Signal (HT-SIG) as shown in FIG. 3 for the HT-greenfield format PPDU, or a combination thereof as shown in FIG. 3 for the HT-mixed format PPDU. Hence, the first radio device 110 may, after a CTS packet has been received from a second radio device, look for energy and an 802.11 Preamble. If energy is detected, but no 802.11 preamble is recovered, then the transmitting second radio device is, with very high probability, not a Wi-Fi certified device.
3. Non-Wi-Fi certified devices will typically use a non-802.11 OFDM energy profile in a Direct Current (DC) null tone. In LTE, for example, a single DC null which is 15 kHz wide is used, while Wi-Fi uses a 312.5 kHz wide DC null. This difference may be detected by the first radio device using e.g. a Fast Fourier Transformation (FFT). If the first radio device detects that the DC null tone in a transmission received from a second radio device does not use an 802.11 OFDM energy profile, then the transmitting second radio device is, with very high probability, not a Wi-Fi certified device.

4. Furthermore, non-Wi-Fi certified devices will typically use different transmit power for the CTS protected transmission than for the CTS packet. CTS protected transmissions herein refer to the non-802.11 transmissions sent by non-Wi-Fi certified devices after an 802.11 CTS packet and that make use of the 20 dB advantage given to Wi-Fi certified devices. In non-Wi-Fi certified devices these transmissions may be generated by different chipsets, and/or have different Power Spectral Density (PSD) and/or Out-of-Band (OOB) emissions, which results in differences in power levels between the chipsets. This power level will likely differ by several dB, which thus is easily detectable by the first radio device. If the first radio device detects a substantially higher or lower power in the CTS protected transmission than in the CTS packet received from the second radio device, then the transmitting radio device is, with very high probability, not a Wi-Fi certified device.
5. Wi-Fi certified devices are also required to include a Short Interframe Space (SIFS) time from the end of the CTS to the start of the protected frame. Non-Wi-Fi certified devices will extend this time, either to synchronize the non-802.11 frame to a defined timing reference, or due to it takes to perform a handshake. Transmissions which occur after a time exceeding the SIFS time may be detected as non-802.11 compliant. If the first radio device detects that the interval between the CTS transmission and the start of the following CTS protected frame received from the second radio device substantially does not meet 802.11 timing requirements, then the transmitting second radio device is, with very high probability, not a Wi-Fi certified device.
6. Non-Wi-Fi certified devices will also often exhibit a synchronous transmission periodicity, different than Wi-Fi certified devices, and will thus not follow an 802.11 Time Unit (TU). For example, periodic Discovery Reference Signal (DRS) transmissions are transmitted every 40.0, 80.0, or 160.0 milliseconds according to the 3GPP standard, while 802.11 beacons are typically sent every 100 TU where TU=1024 microseconds. The first radio device may monitor the time periodicity of 802.11 transmissions received from a second radio device and may search specifically for repetitive rates, such as e.g. 40.0 milliseconds, 80.0 milliseconds, and 160.0 milliseconds for LTE. However, future standards may have their own unique periodicities which may also be monitored in the same way. Hence, the embodiment described herein shall not be limited to periodicities for LTE mentioned above. When the first radio device detects that the periodicity of the received transmission follows a known non-802.11 rate, then the transmitting second radio device is, with very high probability, not a Wi-Fi certified device.

One or more of the various triggers mentioned in paragraphs 1 to 6 above may be used to detect a non-Wi-Fi certified device transmitting 802.11 signals. Once the first radio device is able to discern genuine Wi-Fi certified transmissions from non-Wi-Fi certified transmissions, the first radio device, such as e.g. a Wi-Fi certified node, a Wi-Fi certified user equipment, a non-Wi-Fi certified node or a non-Wi-Fi certified user equipment, may use this information in several ways.

According to some embodiments herein the first radio device may use the information to apply an optimized Carrier Sense Multiple Access (CSMA) set of parameters. CSMA is a media access control (MAC) protocol in which a radio device verifies the absence of other traffic before transmitting on a shared transmission medium, such as an electrical bus or a band of an electromagnetic spectrum. The radio device transmitting attempts to determine whether another transmission is in progress before initiating a transmission using a carrier-sense mechanism. That is, it tries to detect the presence of a carrier signal from another radio device before attempting to transmit. If a carrier is sensed, the radio device waits for the transmission in progress to end before initiating its own transmission. Using CSMA, multiple radio devices may, in turn, send and receive on the same medium. Transmissions by one radio device are generally received by all other radio devices connected to the medium.

Variations on basic CSMA include addition of collision-avoidance, collision-detection and collision-resolution techniques. In this case, the first radio device, such as e.g. the Wi-Fi certified node, the Wi-Fi certified user equipment, the non-Wi-Fi certified node or the non-Wi-Fi certified user equipment, may recognize that the non-Wi-Fi certified transmitter is an LTE-LAA, and may decide that a 10 dB reduction in ED threshold is warranted, since LTE-LAA radios are typically designed to operate with significantly higher SINR levels due to a tighter subcarrier spacing yielding longer OFDM symbols. It is well known that LTE is designed to operate with negative SINR levels, while 802.11 minimum SINR requirements are typically much higher.

Given this information, the first radio device may alter its own behavior, for example to adapt the CCA-PD threshold for the genuine Wi-Fi certified device, such as e.g. ignore the CCA-PD threshold, change channels or alter the ED threshold.

The first radio device may also communicate the information to other elements in its network such as RRM, operations and management functions, e.g. in order to alert network administrators, other Wi-Fi certified access points or Wi-Fi certified stations so that they may alter their behavior.

Other examples include but are not limited to: collecting information about the type of neighbor devices, changing the network connection preference of user devices, such as e.g. smartphones, by means of broadcast signaling, changing the CSMA parameters such as CW min/max, etc.

In scenarios where the first radio device based on the above mentioned triggers detects a specific bad MAC address, which is used to protect the non-Wi-Fi certified device, then the first radio device may also reject the protection packets, such as the CTS packet.

The subsequent claims will address details of each of the embodiments, based on the method of detection.

Figure 5:
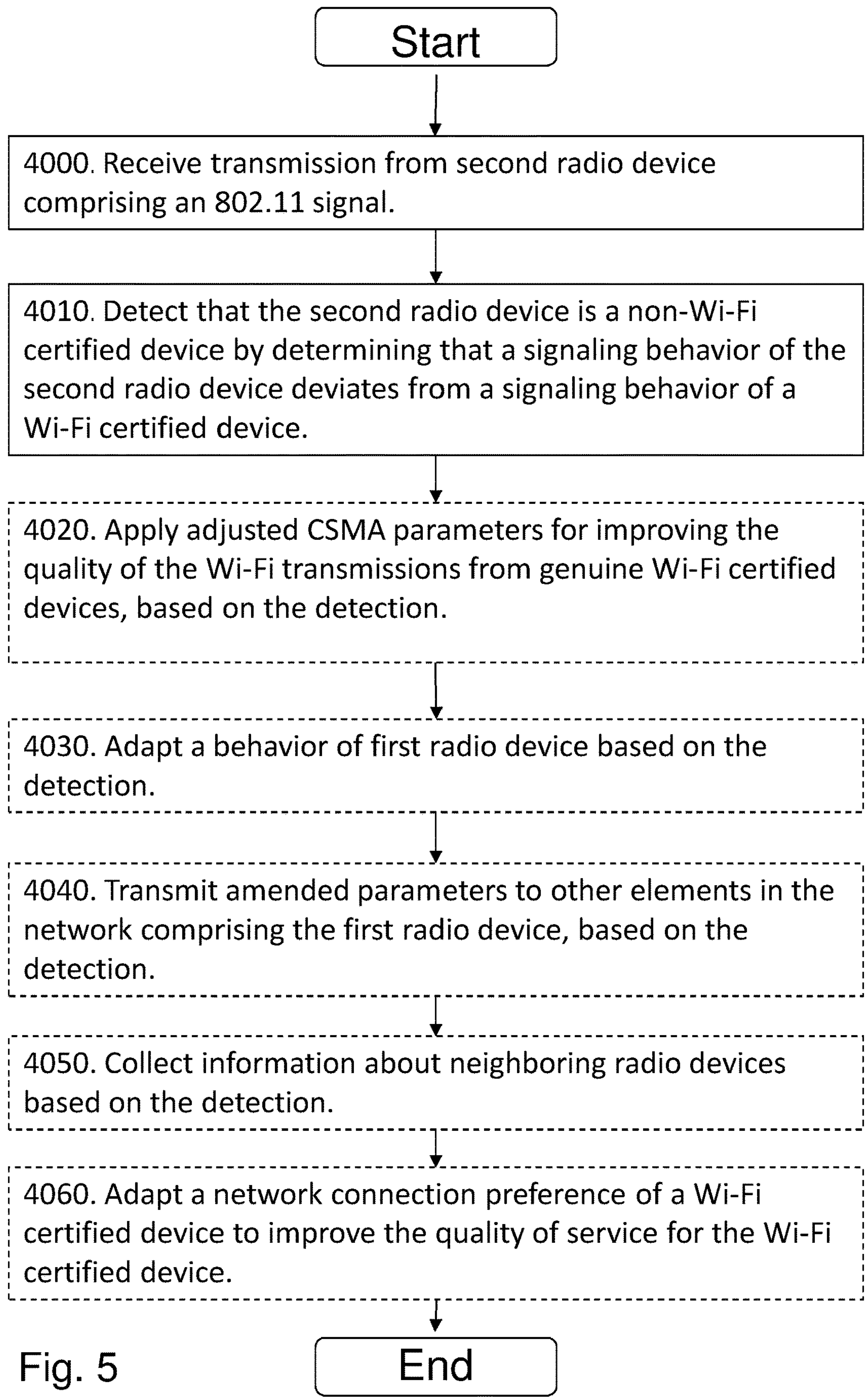
FIG. 5 is a flowchart depicting a method performed by a first radio device according to embodiments herein.

The method actions performed by the first radio device 110, for handling 802.11 signals transmitted by a second radio device 121, wherein the second radio device is a non-Wi-Fi certified device, will now be described with reference to a flowchart depicted in FIG. 5.

The actions do not have to be taken in the order stated below, but may be taken in any suitable order. Actions performed in some embodiments only are marked with dashed boxes.

Action 4000: The first radio device 110 receives a transmission from the second radio device 121, wherein the transmission comprises an 802.11 signal Action 4010: The first radio device 110 detects that the second radio device is a non-Wi-Fi certified device 121, by determining that the signaling behavior of the second radio device 121 deviates from the signaling behavior of a Wi-Fi certified device. According to one embodiment herein the first radio device 110 may detect that the second radio device 121 is a non-Wi-Fi certified device by determining that an 802.11 management frame, such as e.g. a CTS frame, is received from the second radio device 121 in the absence of an 802.11 beacon frame. This embodiment of action 4010 is similar to trigger 1 as described above.

According to a further embodiment herein the first radio device 110 may detect that the second radio device 121 is a non-Wi-Fi certified device by determining that an 802.11 physical layer frame is received from the second radio device 121 in the absence of an 802.11 beacon frame. This embodiment of action 4010 is similar to trigger 1 as described above.

According to a further embodiment herein the first radio device 110 may detect that the second radio device 121 is a non-Wi-Fi certified device by determining that an 802.11 management frame is received from the second radio device (121) in the absence of a following 802.11 preamble. This embodiment of action 4010 is similar to trigger 2 as described above.

According to a further embodiment herein the first radio device 110 may detect that the second radio device 121 is a non-Wi-Fi certified device by determining that a DC null tone of the transmission received from the second radio device (121) has a width different than the DC null tone for 802.11 of 312.5 kHz. The first radio device 110 may determine the width of the DC null tone using a Fast Fourier Transformation (FFT). This embodiment of action 4010 is similar to trigger 3 as described above.

According to a further embodiment herein the first radio device 110 may detect that the second radio device 121 is a non-Wi-Fi certified device by determining that an 802.11 management frame received from the second radio device 121 is transmitted with a first power level and a transmission following the Wi-Fi management frame received from the second radio device 121 is transmitted with a second power level different than the first power level. This embodiment of action 4010 is similar to trigger 4 as described above.

According to a further embodiment herein the first radio device 110 may detect that the second radio device 121 is a non-Wi-Fi certified device by determining that a time interval from the end of an 802.11 management frame received from the second radio device 121 to the start of the following transmission from the second radio device 121 exceeds a predetermined time frame. The predetermined time frame may e.g. be an 802.11 Short Interframe Space (SIFS) timing requirement. This embodiment of action 4010 is similar to trigger 5 as described above.

According to a further embodiment herein the first radio device 110 may detect that the second radio device 121 is a non-Wi-Fi certified device by determining that an end of an 802.11 long preamble received from the second radio device 121 and a start of a following transmission received from the second radio device 121 is not contiguous in time. This embodiment of action 4010 is similar to trigger 6 as described above.

According to a further embodiment herein the first radio device 110 may detect that the second radio device 121 is a non-Wi-Fi certified device by determining that the transmission received from the second radio device 121 is transmitted with a synchronous transmission periodicity different than Wi-Fi certified devices and is not following an 802.11 Time Unit (TU).

Action 4020: The first radio device 110 may in some embodiments apply adjusted Carrier Sense Multiple Access, CSMA, parameters for improving the quality of the 802.11 transmissions from genuine Wi-Fi certified devices, based on the detection of the second radio device (121) transmitting 802.11 signals being a non-Wi-Fi certified device. In other words, it is based on the detection of the deviating signaling behavior of the non-Wi-Fi certified device.

Action 4030: The first radio device 110 may in some further embodiments adapt the behavior of the first radio device 110 based on the detection of the second radio device 121 transmitting 802.11 signals being a non-Wi-Fi certified device. The first radio device 110 may e.g. adapt a Clear Channel Assessment-Preamble Detection (CCA-PD) threshold, change channels and/or alter an Energy Detection (ED) threshold.

Action 4040: The first radio device 110 may in some further embodiments transmit amended parameters to other elements, such as e.g. other radio devices, in the network comprising the first radio device 110. The other elements, such as e.g. other radio devices, in the network may use the amended parameters to adapt their own behavior.

Action 4050: The first radio device 110 may in some further embodiments collect information about neighboring radio devices based on the detection that the first radio device 121 is a non-Wi-Fi certified device.

Action 4060: The first radio device 110 may in some further embodiments adapt a network connection preference of a Wi-Fi certified device to improve the quality of service for the Wi-Fi certified device.

Figure 6:
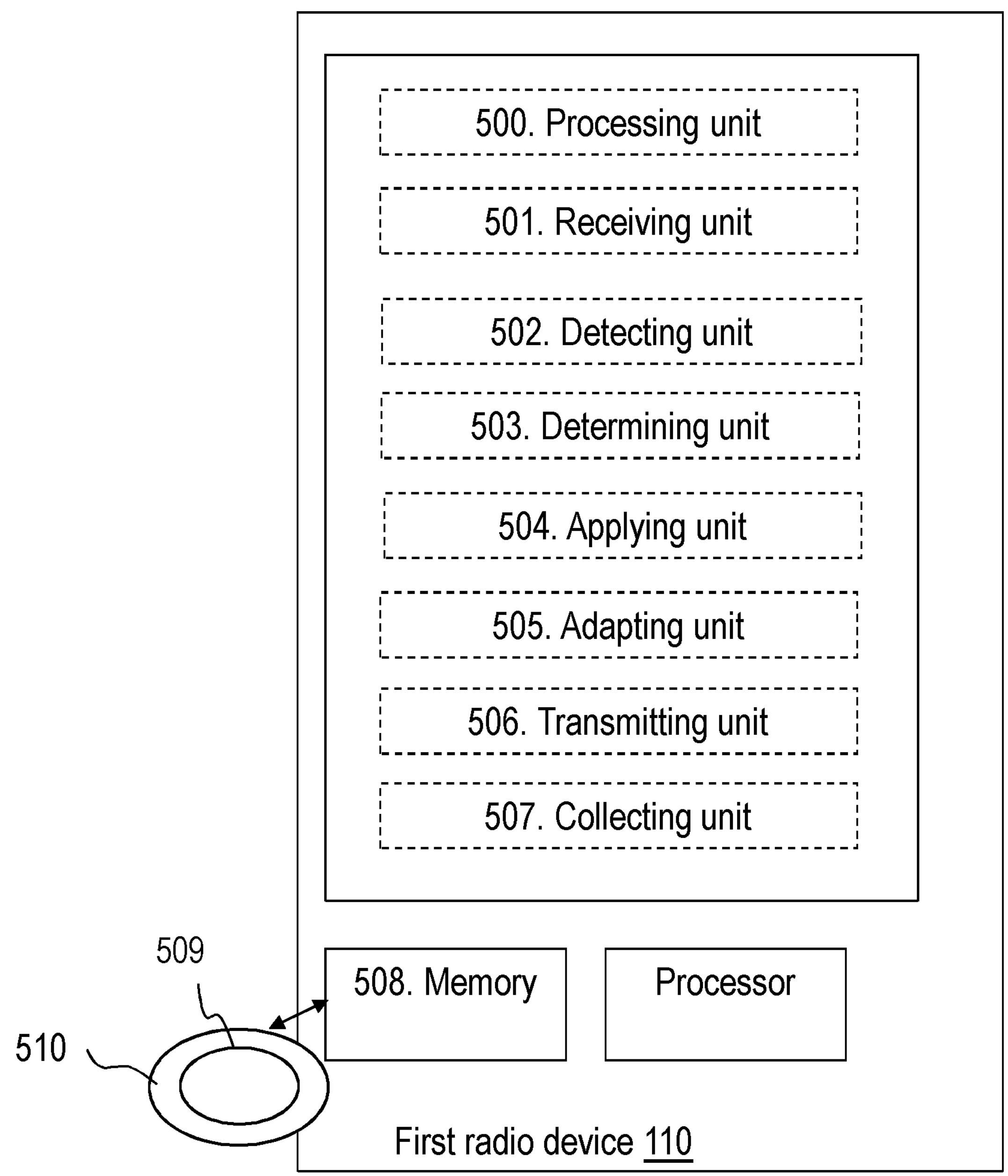
FIG. 6 is a block diagram depicting a first radio device according to embodiments herein.

FIG. 6 is a block diagram depicting the first radio device 110, for handling 802.11 signals transmitted by second radio device 121, wherein the second radio device (121) is a non-Wi-Fi certified device.

The first radio device 110 may comprise a processing unit 500, such as e.g. one or more processors, a receiving unit 501, a detecting unit 502, a determining unit 503, an applying unit 504, an adapting unit 505, a transmitting unit 506 and a collecting unit 507 as exemplifying hardware units configured to perform the methods described herein.

The first radio device 110, the receiving unit 501, the determining unit 503 and/or the processing unit 500 is configured to receive a transmission from the second radio device 121 comprising an 802.11 signal.

The first radio device 110, the detecting unit 502, the determining unit 503 and/or the processing unit 500 is configured to detect that the second radio device 121 transmitting an 802.11 signal is a non-Wi-Fi certified device, by determining that the signaling behavior of the second radio device 121 deviates from the signaling behavior of a Wi-Fi certified device.

The first radio device 110, the detecting unit 502, the determining unit 503 and/or the processing unit 500 may further be configured to detect that the second radio device 121 transmitting an 802.11 signal is a non-Wi-Fi certified device by being configured to determine that an 802.11 management frame is transmitted received from the second radio device 121 in the absence of an 802.11 beacon frame.

The first radio device 110, the detecting unit 502, the determining unit 503 and/or the processing unit 500 may further be configured to detect that the second radio device 121 transmitting an 802.11 signal is a non-Wi-Fi certified device by being configured to determine that an 802.11 physical layer frame is received from the second radio device 121 in the absence of an 802.11 beacon frame.

The first radio device 110, the detecting unit 502, the determining unit 503 and/or the processing unit 500 may further be configured to detect that the second radio device 121 transmitting an 802.11 signal is a non-Wi-Fi certified device by being configured to determine that an 802.11 management frame is received from the second radio device 121 in the absence of a following 802.11 preamble.

The first radio device 110, the detecting unit 502, the determining unit 503 and/or the processing unit 500 may further be configured to detect that the second radio device 121 transmitting an 802.11 signal is a non-Wi-Fi certified device by being configured to determine that a DC null tone of the transmission received from the second radio device 121 has a width different than the DC null tone for 802.11 of 312.5 kHz. The first radio device 110, the detecting unit 502, the determining unit 503 and/or the processing unit 500 may further be configured to determine the width of the DC null tone received by the second radio device (121) by using a Fast Fourier Transformation (FFT).

The first radio device 110, the detecting unit 502, the determining unit 503 and/or the processing unit 500 may further be configured to detect that the second radio device 121 transmitting an 802.11 signal is a non-Wi-Fi certified device, by being configured to determine that an 802.11 management frame received from the second radio device 121 is transmitted with a first power level and a transmission following the Wi-Fi management frame received from the second radio device 121 is transmitted with a second power level different than the first power level.

The first radio device 110, the detecting unit 502, the determining unit 503 and/or the processing unit 500 may further be configured to detect that the second radio device 121 transmitting an 802.11 signal is a non-Wi-Fi certified device, by being configured to determine that a time interval from the end of an 802.11 management frame received from the second radio device 121 to the start of the following transmission from the second radio device 121 exceeds a predetermined time frame. The predetermined time frame may e.g. be an 802.11 Short Interframe Space (SIFS) timing requirement.

The first radio device 110, the detecting unit 502, the determining unit 503 and/or the processing unit 500 may further be configured to detect that the second radio device 121 transmitting an 802.11 signal is a non-Wi-Fi certified device, by being configured to determine that an end of an 802.11 long preamble received from the second radio device 121 and a start of a following transmission received from the second radio device 121 is not contiguous in time.

The first radio device 110, the detecting unit 502, the determining unit 503 and/or the processing unit 500 may further be configured to detect that the second radio device 121 transmitting an 802.11 signal is a non-Wi-Fi certified device, by being configured to by being configured to determine that the transmission received from the second radio device 121 is transmitted with a synchronous transmission periodicity different than Wi-Fi certified devices and is not following an 802.11 Time Unit (TU).

The first radio device 110, the applying unit 504 and/or the processing unit 500 may further be configured to apply adjusted Carrier Sense Multiple Access (CSMA) parameters for improving the quality of the 802.11 transmissions from genuine Wi-Fi certified devices, based on the detection of the second radio device 121 transmitting 802.11 signals being a non-Wi-Fi certified device.

The first radio device 110, the adapting unit 505 and/or the processing unit 500 may further be configured to adapt the behavior of the first radio device 110 based on the detection of the second radio device 121 transmitting 802.11 signals being a non-Wi-Fi certified device. The first radio device 110, the adapting unit 505 and/or the processing unit 500 may e.g. be configured to adapt the behavior by adapting a Clear Channel Assessment-Preamble Detection (CCA-PD) threshold, changing channels and/or alter an Energy Detection (ED) threshold.

The first radio device 110, the applying unit 504 and/or the processing unit 500 may further be configured to transmit amended parameters to other elements in a network, which network comprises the first radio device 110.

The first radio device 110, the collecting unit 506 and/or the processing unit 500 may further be configured to collect information about neighboring devices based on the detection that the first radio device 121 is a non-Wi-Fi certified device.

The first radio device 110, the adapting unit 505 and/or the processing unit 500 may further be configured to adapt a network connection preference of a Wi-Fi certified device to improve the quality of service for the Wi-Fi certified device.

The embodiments herein may be implemented through a respective processor or one or more processors, such as the processing unit 500 of a processing circuitry in the first radio device depicted in FIG. 6, together with respective computer program code for performing the functions and actions of the embodiments herein. The program code mentioned above may also be provided as a computer program product, for instance in the form of a data carrier carrying computer program code for performing the embodiments herein when being loaded into the first radio device 110. One such carrier may be in the form of a CD ROM disc. It is however feasible with other data carriers such as a memory stick. The computer program code may furthermore be provided as pure program code on a server and downloaded to the first radio device 110.

The first radio device 110 may further comprise a memory 508. The memory 508 comprises one or more memory units to be used to store data on, such as software, patches, system information, configurations, diagnostic data, performance data and/or applications to perform the methods disclosed herein when being executed, and similar.

The methods according to the embodiments described herein for the first radio device 110 are respectively implemented by means of e.g. a computer program 509 or a computer program product, comprising instructions, i.e., software code portions, which, when executed on at least one processor, cause the at least one processor to carry out the actions described herein, as performed by the first radio device 110. The computer program 509 may be stored on a computer-readable storage medium 610, e.g. a disc or similar. The computer-readable storage medium 610, having stored thereon the computer program, may comprise instructions which, when executed on at least one processor, cause the at least one processor to carry out the actions described herein, as performed by the first radio device 110. In some embodiments, the computer-readable storage medium may be a non-transitory computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes or devices will appreciate the cost, performance, and maintenance trade-offs inherent in these design choices.

Further Extensions and Variations

Figure 7:
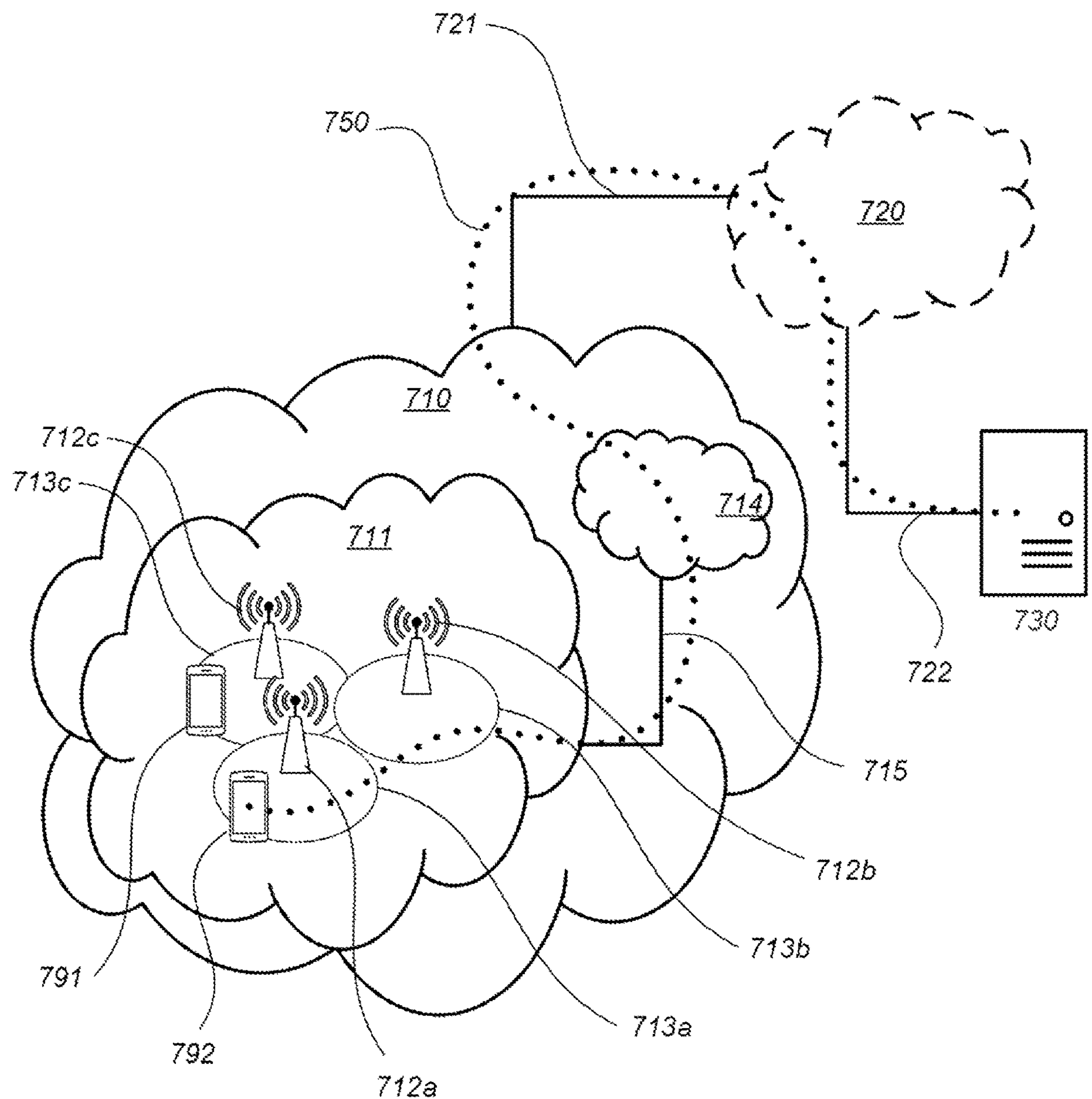
FIG. 7 is a schematic overview of a telecommunication network connected via an intermediate network to a host computer in accordance with some embodiments.

With reference to FIG. 7, in accordance with an embodiment, a communication system includes a telecommunication network 710 such as the wireless communications network 100, e.g. a WLAN, such as a 3GPP-type cellular network, which comprises an access network 711, such as a radio access network, and a core network 714. The access network 711 comprises a plurality of base stations 712*a*, 712*b*, 712*c*, such as e.g. the first radio device 110 or the second radio device 121, 122, access nodes, AP STAs NBs, eNBs, gNBs or other types of wireless access points, each defining a corresponding coverage area 713*a*, 713*b*, 713*c*. Each base station 712*a*, 712*b*, 712*c* is connectable to the core network 714 over a wired or wireless connection 715. A first user equipment (UE) such as e.g. the second radio device 121, 122 or the first radio device 110 such as a Non-AP STA 791 located in coverage area 713*c* is configured to wirelessly connect to, or be paged by, the corresponding base station 712*c*. A second UE 792 e.g. the wireless device 122 such as a Non-AP STA in coverage area 713*a* is wirelessly connectable to the corresponding base station 712*a*. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
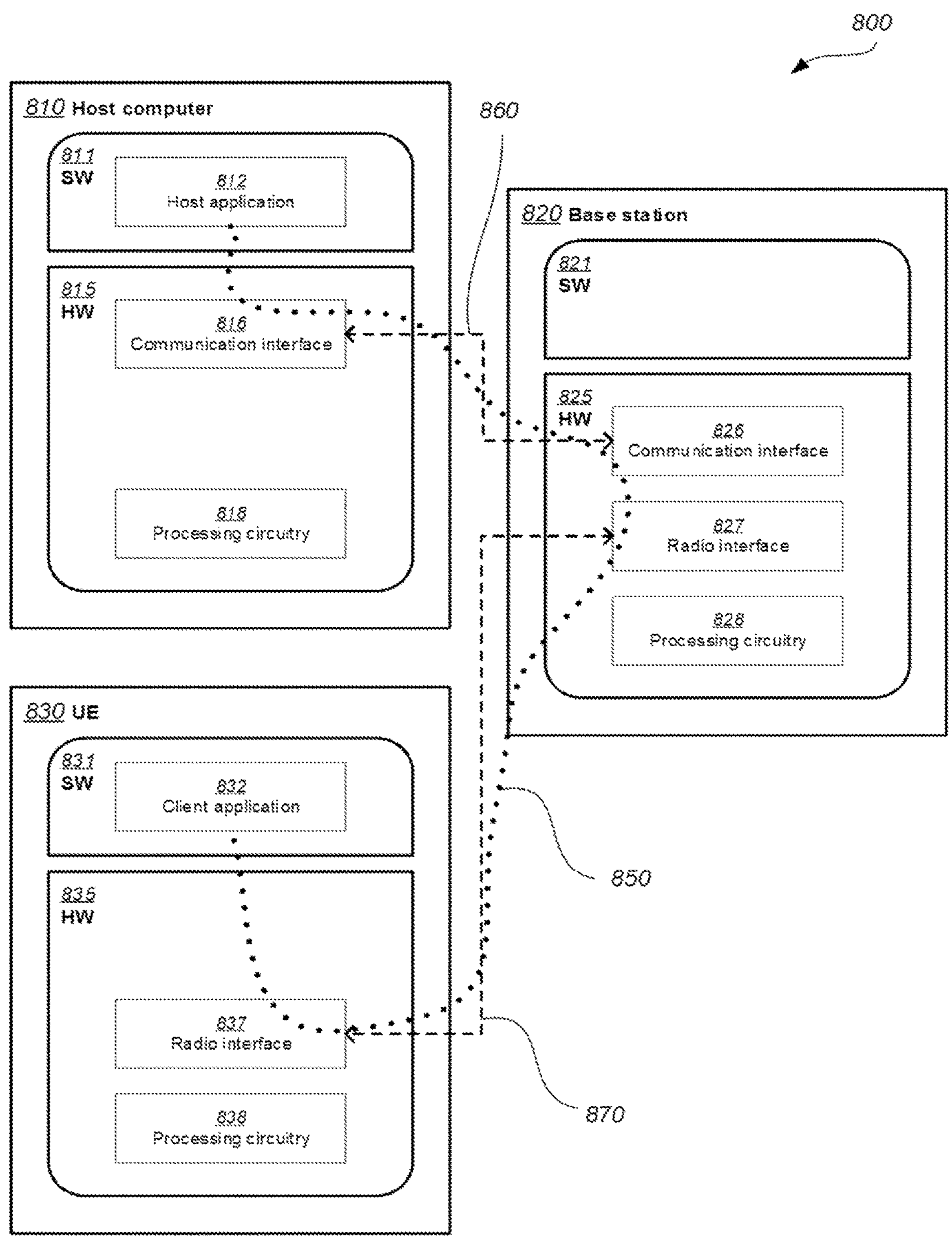
FIG. 8 is a schematic overview of a host computer communicating via a base station with a user equipment over a partially wireless connection in accordance with some embodiments.

It is noted that the host computer 810, base station 820 and UE 830 illustrated in FIG. 8 may be identical to the host computer 730, one of the base stations 712*a*, 712*b*, 712*c* and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the data rate and latency and thereby provide benefits such as reduced user waiting time, relaxed restriction on file size and better responsiveness.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

Figure 9:
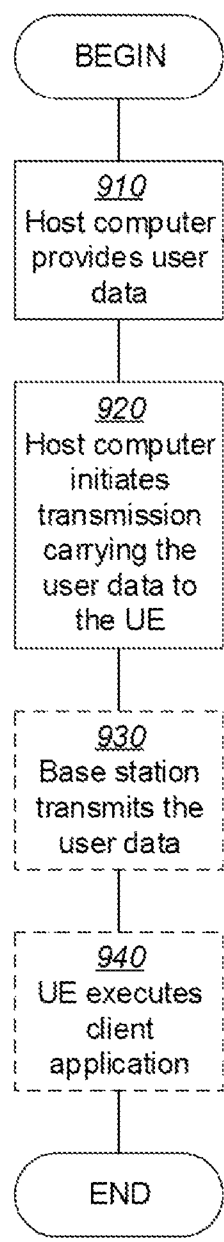
FIG. 9 is a flowchart depicting methods implemented in a communication system including a host computer, a base station and a user equipment in accordance with some embodiments.

FIG. 9 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 9 will be included in this section. In a first action 910 of the method, the host computer provides user data. In an optional subaction 911 of the first action 910, the host computer provides the user data by executing a host application. In a second action 920, the host computer initiates a transmission carrying the user data to the UE. In an optional third action 930, the base station transmits to the UE the user data which was carried in the transmission that the host computer initiated, in accordance with the teachings of the embodiments described throughout this disclosure. In an optional fourth action 940, the UE executes a client application associated with the host application executed by the host computer.

Figure 10:
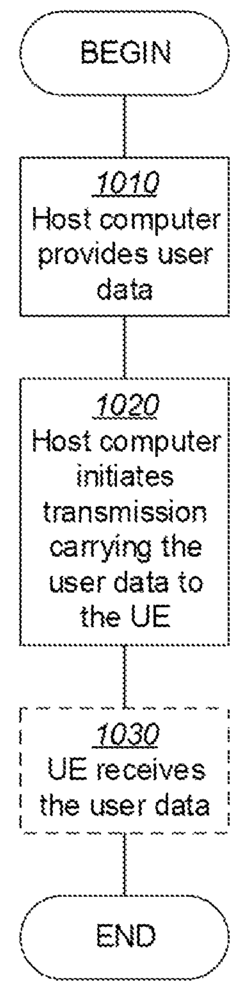
FIG. 10 is a flowchart depicting methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 10 will be included in this section. In a first action 1010 of the method, the host computer provides user data. In an optional subaction (not shown) the host computer provides the user data by executing a host application. In a second action 1020, the host computer initiates a transmission carrying the user data to the UE. The transmission may pass via the base station, in accordance with the teachings of the embodiments described throughout this disclosure. In an optional third action 1030, the UE receives the user data carried in the transmission.

Figures 11, 12:
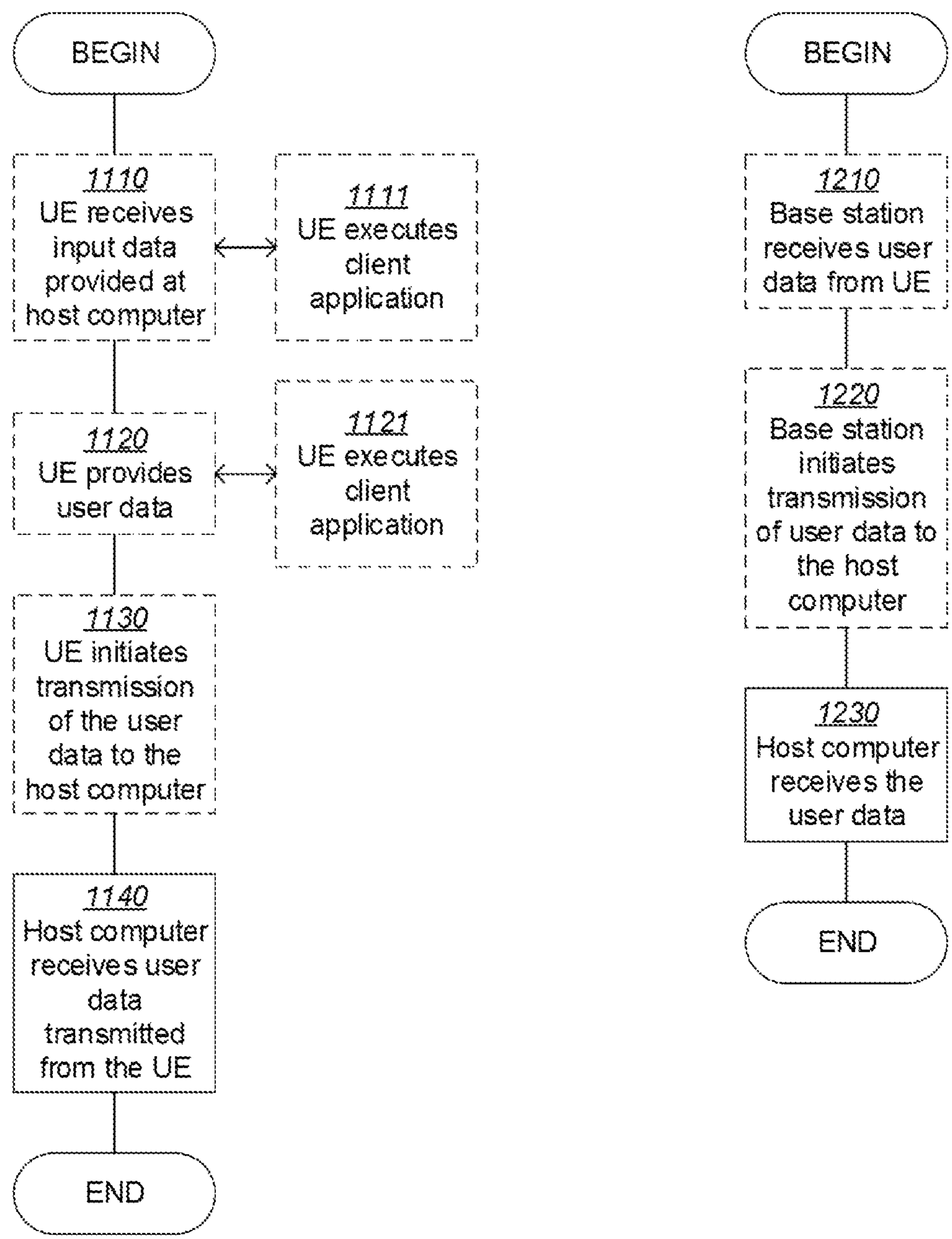
FIG. 11 is a flowchart depicting methods implemented in a communication system including a host computer, a base station and a user equipment in accordance with some embodiments.
FIG. 12 is a flowchart depicting methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 11 will be included in this section. In an optional first action 1110 of the method, the UE receives input data provided by the host computer. Additionally or alternatively, in an optional second action 1120, the UE provides user data. In an optional subaction 1121 of the second action 1120, the UE provides the user data by executing a client application. In a further optional subaction 1111 of the first action 1110, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 1130, transmission of the user data to the host computer. In a fourth action 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIGS. 7 and 8. For simplicity of the present disclosure, only drawing references to FIG. 12 will be included in this section. In an optional first action 1210 of the method, in accordance with the teachings of the embodiments described throughout this disclosure, the base station receives user data from the UE. In an optional second action 1220, the base station initiates transmission of the received user data to the host computer. In a third action 1230, the host computer receives the user data carried in the transmission initiated by the base station.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first radio device for handling 802.11 signals transmitted by a second radio device, the method comprising:
- receiving a transmission from the second radio device comprising an 802.11 signal; and
- detecting that the second radio device is a non-Wi-Fi certified device, wherein detecting that the second radio device is a non-WiFi certified device comprises determining that the signaling behavior of the second radio device deviates from the signaling behavior of a Wi-Fi certified device.

2. The method of claim 1, wherein the step of determining that the signaling behavior of the second radio device deviates from the signaling behavior of a Wi-Fi certified device comprises:
- determining that an 802.11 management frame is received from the second radio device in the absence of an 802.11 beacon frame.

3. The method of claim 1, wherein the step of determining that the signaling behavior of the second radio device deviates from the signaling behavior of a Wi-Fi certified device comprises:
- determining that an 802.11 physical layer frame is received from the second radio device in the absence of an 802.11 beacon frame.

4. The method of claim 1, wherein the step of determining that the signaling behavior of the second radio device deviates from the signaling behavior of a Wi-Fi certified device comprises:
- determining that an 802.11 management frame is received from the second radio device in the absence of a following 802.11 preamble.

5. The method of claim 1, wherein the step of determining that the signaling behavior of the second radio device deviates from the signaling behavior of a Wi-Fi certified device comprises:
- determining that a DC null tone of the transmission received from the second radio device has a width different than the DC null tone for 802.11 of 312.5 kHz.

6. The method of claim 5, wherein the width of the DC null tone is determined using a Fast Fourier Transformation.

7. The method of claim 1, wherein the step of determining that the signaling behavior of the second radio device deviates from the signaling behavior of a Wi-Fi certified device comprises:
- determining that an 802.11 management frame received from the second radio device is transmitted with a first power level and a transmission following the Wi-Fi management frame received from the second radio device is transmitted with a second power level different than the first power level.

8. The method of claim 1, wherein the step of determining that the signaling behavior of the second radio device deviates from the signaling behavior of a Wi-Fi certified device comprises:
- determining that a time interval from the end of an 802.11 management frame received from the second radio device to the start of the following transmission from the second radio device exceeds a predetermined time frame.

9. The method of claim 8, wherein the predetermined time frame is an 802.11 Short Interframe Space timing requirement.

10. The method of claim 1, wherein the step of determining that the signaling behavior of the second radio device deviates from the signaling behavior of a Wi-Fi certified device comprises:
- determining that an end of an 802.11 long preamble received from the second radio device and a start of a following transmission received from the second radio device is not contiguous in time.

11. The method of claim 1, wherein the step of determining that the signaling behavior of the second radio device deviates from the signaling behavior of a Wi-Fi certified device comprises:
- determining that the transmission received from the second radio device is transmitted with a synchronous transmission periodicity different than Wi-Fi certified devices and is not following an 802.11 Time Unit, TU.

12. The method according to claim 1, wherein the method further comprises:
- applying adjusted Carrier Sense Multiple Access, CSMA, parameters for improving the quality of the 802.11 transmissions from genuine Wi-Fi certified devices, based on the detection of the second radio device transmitting 802.11 signals being a non-Wi-Fi certified device.

13. The method of claim 1, wherein the method further comprises:
- adapting the behavior of the first radio device based on the detection of the second radio device transmitting 802.11 signals being a non-Wi-Fi certified device, such as e.g. adapting a Clear Channel Assessment-Preamble Detection, CCA-PD, threshold, changing channels and/or alter an Energy Detection, ED, threshold.

14. The method of claim 13, wherein the method further comprises:
- transmitting the amended parameters to other elements in a network comprising the first radio device.

15. The method of claim 1, wherein the method further comprises:

collecting information about neighboring radio devices based on the detection that the first radio device is a non-Wi-Fi certified device.

16. The method of claim 1, wherein the method further comprises:

adapting a network connection preference of a Wi-Fi certified device to improve the quality of service for the Wi-Fi certified device.

17. A computer program product comprising a non-transitory computer readable medium storing a computer program comprising instructions, which, when executed on at least one processor, cause the at least one processor to carry out the method of claim 1.

18. A first radio device, for handling 802.11 signals transmitted by second radio device, wherein the second radio device is a non-Wi-Fi certified device, the first radio device being configured to:

receive a transmission from the second radio device comprising an 802.11 signal; and detect that the second radio device transmitting an 802.11 signal is a non-Wi-Fi certified device.

19. The first radio device of claim 18, wherein the first radio device is configured to detect that the second radio device transmitting an 802.11 signal is a non-Wi-Fi certified device, by being configured to determine that an 802.11 management frame is transmitted received from the second radio device in the absence of an 802.11 Wi-Fi beacon frame.

20. The first radio device of claim 18, wherein the first radio device is configured to detect that the second radio device transmitting an 802.11 signal is a non-Wi-Fi certified device, by being configured to determine that an 802.11 physical layer frame is received from the second radio device in the absence of an 802.11 beacon frame.

21. The first radio device of claim 18, wherein the first radio device is configured to detect that the second radio device transmitting an 802.11 signal is a non-Wi-Fi certified device, by being configured to determine that an 802.11 management frame is received from the second radio device in the absence of a following 802.11 preamble.

22. The first radio device of claim 18, wherein the first radio device is configured to detect that the second radio device transmitting an 802.11 signal is a non-Wi-Fi certified device, by being configured to determine that a DC null tone of the transmission received from the second radio device has a width different than the DC null tone for 802.11 of 312.5 kHz.

23. The first radio device of claim 22, wherein the first radio device is configured to determine the width of the DC null tone by using a Fast Fourier Transformation.

24. The first radio device of claim 18, wherein the first radio device is configured to detect that the second radio device transmitting an 802.11 signal is a non-Wi-Fi certified device, by being configured to determine that an 802.11 management frame received from the second radio device is transmitted with a first power level and a transmission following the Wi-Fi management frame received from the second radio device is transmitted with a second power level different than the first power level.

25. The first radio device of claim 18, wherein the first radio device is configured to detect that the second radio device transmitting an 802.11 signal is a non-Wi-Fi certified device, by being configured to determine that a time interval from the end of an 802.11 management frame received from the second radio device to the start of the following transmission from the second radio device exceeds a predetermined time frame.

26. The first radio device according to of claim 25, wherein the predetermined time frame is an 802.11 Short Interframe Space timing requirement.

27. The first radio device of claim 18, wherein the first radio device is configured to detect that the second radio device transmitting an 802.11 signal is a non-Wi-Fi certified device, by being configured to determine that an end of an 802.11 long preamble received from the second radio device and a start of a following transmission received from the second radio device is not contiguous in time.

28. The first radio device of claim 18, wherein the first radio device is configured to detect that the second radio device transmitting an 802.11 signal is a non-Wi-Fi certified device, by being configured to determine that the transmission received from the second radio device is transmitted with a synchronous transmission periodicity different than Wi-Fi certified devices and is not following an 802.11 Time Unit, TU.

29. The first radio device according to of claim 18, wherein the first radio device is further configured to:

apply adjusted Carrier Sense Multiple Access, CSMA, parameters for improving the quality of the 802.11 transmissions from genuine Wi-Fi certified devices, based on the detection of the second radio device transmitting 802.11 signals being a non-Wi-Fi certified device.

30. The first radio device of claim 18, wherein the first radio device is further configured to:

adapt the behavior of the first radio device based on the detection of the second radio device transmitting 802.11 signals being a non-Wi-Fi certified device, such as e.g. adapting a Clear Channel Assessment-Preamble Detection, CCA-PD, threshold, changing channels and/or alter an Energy Detection, ED, threshold.

31. The first radio device of claim 30, wherein the first radio device is further configured to:

transmit the amended parameters to other elements in a network comprising the first radio device.

32. The first radio device of claim 18, wherein the first radio device is further configured to:

collect information about neighboring radio devices based on the detection that the first radio device is a non-Wi-Fi certified device.

33. The first radio device of claim 18, wherein the first radio device is further configured to:

adapt a network connection preference of a Wi-Fi certified device to improve the quality of service for the Wi-Fi certified device.

34. A first radio device, for handling 802.11 signals transmitted by second radio device, wherein the second radio device is a non-Wi-Fi certified device, the first radio device comprising a processor and a memory, said memory comprising instructions executable by said processor whereby said first radio device is operative to:

receive a transmission from the second radio device comprising an 802.11 signal; and detect that the second radio device transmitting an 802.11 signal is a non-Wi-Fi certified device.

* * * * *